United States Patent
Assali

(10) Patent No.: US 10,505,912 B2
(45) Date of Patent: Dec. 10, 2019

(54) ELECTRONIC VERIFICATION SYSTEM USING DIGITAL FOOTPRINT

(71) Applicant: Google LLC, Mountain View, CA (US)

(72) Inventor: Cinthia Assali, Paris (FR)

(73) Assignee: Google LLC, Mountain View, CA (US)

(*) Notice: Subject to any disclaimer, the term of this patent is extended or adjusted under 35 U.S.C. 154(b) by 192 days.

(21) Appl. No.: 15/479,910

(22) Filed: Apr. 5, 2017

(65) Prior Publication Data
US 2018/0191699 A1 Jul. 5, 2018

(30) Foreign Application Priority Data

Dec. 30, 2016 (EP) .................................... 16306857

(51) Int. Cl.
| | | |
|---|---|---|
| *H04L 29/06* | (2006.01) | |
| *G06F 21/36* | (2013.01) | |
| *G06F 21/45* | (2013.01) | |
| *G06F 21/31* | (2013.01) | |
| *H04W 12/06* | (2009.01) | |

(52) U.S. Cl.
CPC .............. *H04L 63/08* (2013.01); *G06F 21/31* (2013.01); *G06F 21/36* (2013.01); *G06F 21/45* (2013.01); *G06F 2221/2101* (2013.01); *G06F 2221/2103* (2013.01); *G06F 2221/2111* (2013.01); *H04W 12/06* (2013.01)

(58) Field of Classification Search
CPC ......... H04L 63/08; G06F 21/31; G06F 21/36; G06F 21/45; G06F 2221/2101; G06F 2221/2103; G06F 2221/2111; H04W 12/06
See application file for complete search history.

(56) References Cited

U.S. PATENT DOCUMENTS

| | | |
|---|---|---|
| 8,181,015 B2 | 5/2012 | Roskind |
| 8,863,243 B1 | 10/2014 | Lidzborski |
| 2009/0049544 A1 | 2/2009 | Kashi |

(Continued)

OTHER PUBLICATIONS

International Search Report and Written Opinion dated Nov. 14, 2017 in Application PCT/US2017/053682.

(Continued)

*Primary Examiner* — Lynn D Feild
*Assistant Examiner* — Jessica J South
(74) *Attorney, Agent, or Firm* — Lerner, David, Littenberg, Krumholz & Mentlik, LLP

(57) ABSTRACT

A system of authenticating an account user includes an electronic device having a processor and a non-transitory computer-readable storage medium. The system causes an interface to be outputted by the electronic device that includes a graphical element via which a user of the electronic device who is attempting to access an electronic account can initiate a digital history verification process. The system receives a selection of the graphical element, accesses an indication of one or more electronic sources of digital history information and receives digital history information of the user that has been collected by the electronic sources. The system receives one or more verification questions that are based on at least a portion of the digital history information. The system receives from the user answers to the verification questions. In response to determining that every answer is correct, the system grants the user access to the electronic account.

15 Claims, 10 Drawing Sheets

(56) References Cited

U.S. PATENT DOCUMENTS

| | | |
|---|---|---|
| 2010/0138444 A1 | 6/2010 | Logue et al. |
| 2010/0175116 A1 | 7/2010 | Gum |
| 2012/0239950 A1 | 9/2012 | Davis et al. |
| 2013/0024376 A1 | 1/2013 | Choudhuri et al. |
| 2013/0318580 A1 | 11/2013 | Gudlavenkatasiva et al. |
| 2015/0026796 A1 | 1/2015 | Alan et al. |
| 2016/0191498 A1* | 6/2016 | Marien ............... H04L 63/0815 726/7 |

OTHER PUBLICATIONS

Extended European Search Report dated May 3, 2017, issued in European Application No. 16306857.0.

Rabkin, A., "Personal knowledge question for fallback authentication: Security questions in the era of Facebook" 4th Symposium on Usable Privacy and Security 2008 (SOUPS 2008), Pittsburgh, PA, USA, Jul. 23-25, 2008, pp. 13-23.

* cited by examiner

| USER | SOURCE |
|---|---|
| 184637 | MAPS |
| 184637 | EMAIL |
| 184637 | MEDIA STORE |
| 203842 | MAPS |
| 203842 | VIDEO SERVICE A |

ELECTRONIC VERIFICATION SYSTEM USING DIGITAL FOOTPRINT

RELATED APPLICATIONS AND CLAIM OF PRIORITY

This patent application claims priority to European Patent Application No. 16306857.0, filed Dec. 30, 2016. The disclosure of the priority application is incorporated herein by reference in its entirety.

BACKGROUND

Electronic account users must maintain many passwords to protect their identities and access various products and services. When a user forgets a password, the user must endure a lengthy recovery process to verify his or her identity. This may involve setting up a secondary email account to which reset instructions are sent, or registering a phone number to which text message recovery instructions are sent. In addition, many services prohibit the re-use of the same password or password variation. As such, if a user is required to reset the password, he or she must create a new password that may be different than one used for other accounts.

This disclosure describes methods and systems of verifying the identity of an account user without requiring an extensive password recovery process. Specifically, this disclosure describes using an account user's digital history from different products or services to generate questions that can be used to verify a user's identity. As the questions ask for information that should be readily known by the user, this process can be quicker and more efficient than traditional email or SMS verification processes. In addition, this verification process can be used as a secondary verification process to protect accounts from being hacked.

SUMMARY

A system of authenticating an account user includes an electronic device comprising a processor, and a non-transitory computer-readable storage medium. The non-transitory computer-readable storage medium includes one or more programming instructions that cause the processor to perform one or more actions. The system causes a user interface to be outputted by the electronic device. The user interface includes a graphical element via which a user of the electronic device who is attempting to access an electronic account using the electronic device can initiate a digital history verification process. The system receives, via the user interface, a selection of the graphical element. The system accesses, from one or more non-transitory computer-readable media sectors of a data store, an indication of one or more electronic sources of digital history information that have been authorized by the user. The system receives, from one or more electronic devices associated with one or more of the electronic sources, digital history information of the user that has been collected by the electronic sources over one or more time periods. The digital history information represents information about past actions of the user that is collected by the electronic sources and authorized by the user. The system receives one or more automatically generated verification questions that are each based on at least a portion of the digital history information. The system displays to the user via the user interface of the electronic device one or more of the verification questions and one or more answer fields that correspond to each of the verification questions. For each verification question, the system receives from the user an answer to the verification question via a corresponding answer field for the verification question. For each answer that is received, the system determines whether the answer is correct. In response to determining that every answer is correct, the system grants the user access to the electronic account.

Optionally, the system may cause an enrollment user interface to be displayed. The enrollment user interface may include one or more visual representations of one or more possible electronic sources. The system may receive from the user a selection of one or more of the visual representations, where each selection represents an electronic source that is permitted to collect digital history information about the user. The system may cause the selection to be stored in the one or more non-transitory computer-readable media sectors of the data store.

Optionally, the system may receive digital history information that includes location services information indicating where a user electronic device associated with the user was located during an applicable time period. The location services information may be collected by one or more location sensors of the user electronic device. The user electronic device may be a different device than the electronic device.

Optionally, the system may access an indication of one or more electronic sources that are each associated with a same service provider as the electronic account. Alternatively, the system may access an indication of one or more electronic sources, such that one or more of the electronic sources is associated with a service provider that is different than a service provider of the electronic account.

Optionally, the system may receive a selection of a graphical element from the user interface. The system may, in response to determining that every answer is correct, display via the user interface a message indicating that the digital history verification process was successful. The system may, in response to determining that every answer is not correct, display via the user interface a message indicating that the digital history verification process was not successful, and prompt the user to select an alternative verification method.

DETAILED DESCRIPTION

Figure 1:
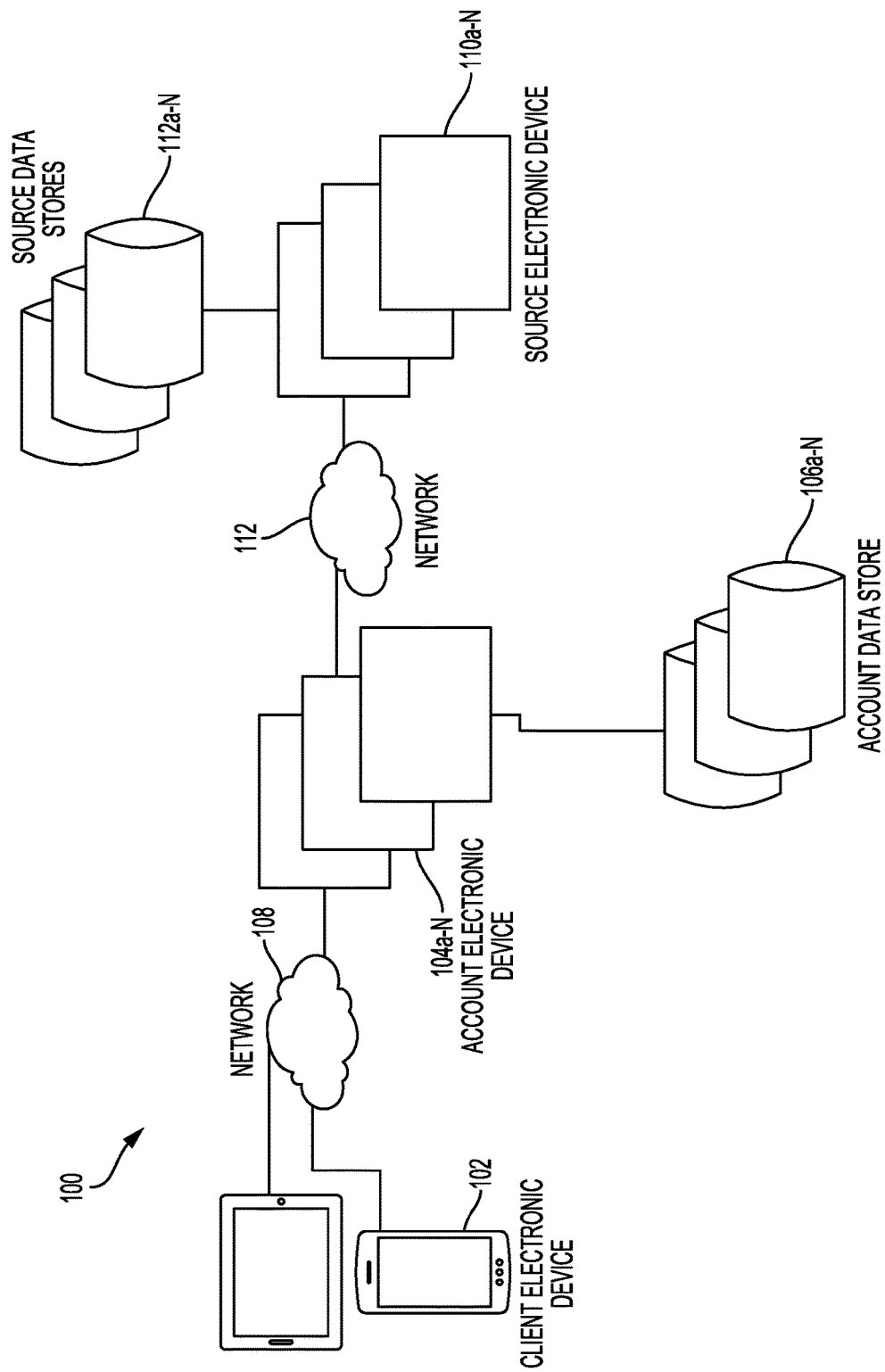
FIG. 1 illustrates an example system for verifying an account user according to an embodiment.

Terminology that is relevant to this disclosure includes:

In this document, the singular forms "a," "an," and "the" include plural references unless the context clearly dictates otherwise. The term "comprising" means "including, but not limited to." Similarly, the term "comprises" means "includes, and is not limited to."

"Digital history information" refers to information pertaining to other electronic products, services or accounts accessed or used by an account user (such as past actions performed by the user) that is collected by an electronic source (with the user's approval) over a period of time.

"Digital history verification process" refers to the process of verifying a user's identity using digital history information of the user for the purposes of allowing the user to access a target account.

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity. Additional elements of electronic devices will be discussed below in the context of FIG. 10.

An "electronic source" refers to an electronic product, service, account or other data.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

A "target account" refers to a user account that is the subject of a digital history information verification process.

A "verification question" refers to a question to verify a user's identity that is based on at least a portion of digital history information for the user.

Unless defined otherwise, all technical and scientific terms used in this document have the same meanings as commonly understood by one of ordinary skill in the art.

FIG. 1 illustrates an example system for verifying an account user according to an embodiment. As illustrated by FIG. 1, the system 100 includes a client electronic device 102, one or more account electronic devices 104a-N, and one or more account data stores 106a-N. The client electronic device may communicate with one or more of the account electronic devices 104a-N via one or more communication networks 108. The system also includes one or more source electronic devices 110a-N that are in communication with one or more of the account electronic devices 104a-N via a communication network 112. A communication network may be a local area network (LAN), a wide area network (WAN), a mobile or cellular communication network, an extranet, an intranet, the Internet and/or the like. One or more of the source electronic devices 110a-N may include or be communication with one or more source data stores 112a-N.

Data stores 106a-N, 112a-N may include one or more non-transitory computer-readable media sectors in which data or other information can be stored.

An account electronic device may manage data associated with one or more user accounts for one or more users. In various embodiments, a user account may correspond to one or more electronic sources. For instance, a service provider may offer many different electronic sources. By creating a single user account with the service provider, a user may access the electronic sources of the service provider. For instance, a service provider may offer an email service, a map service, a content subscription service. A user may access all of these services with the same user account. In other situations, a user may create a user account for each application that the user wishes to access.

A user may create user accounts for electronic sources that are provided by different service providers. For instance, a first service provider may offer a first electronic source, and a second service provider may offer a second electronic source. A user may create user accounts for both the first electronic source and the second electronic source.

Figure 2:
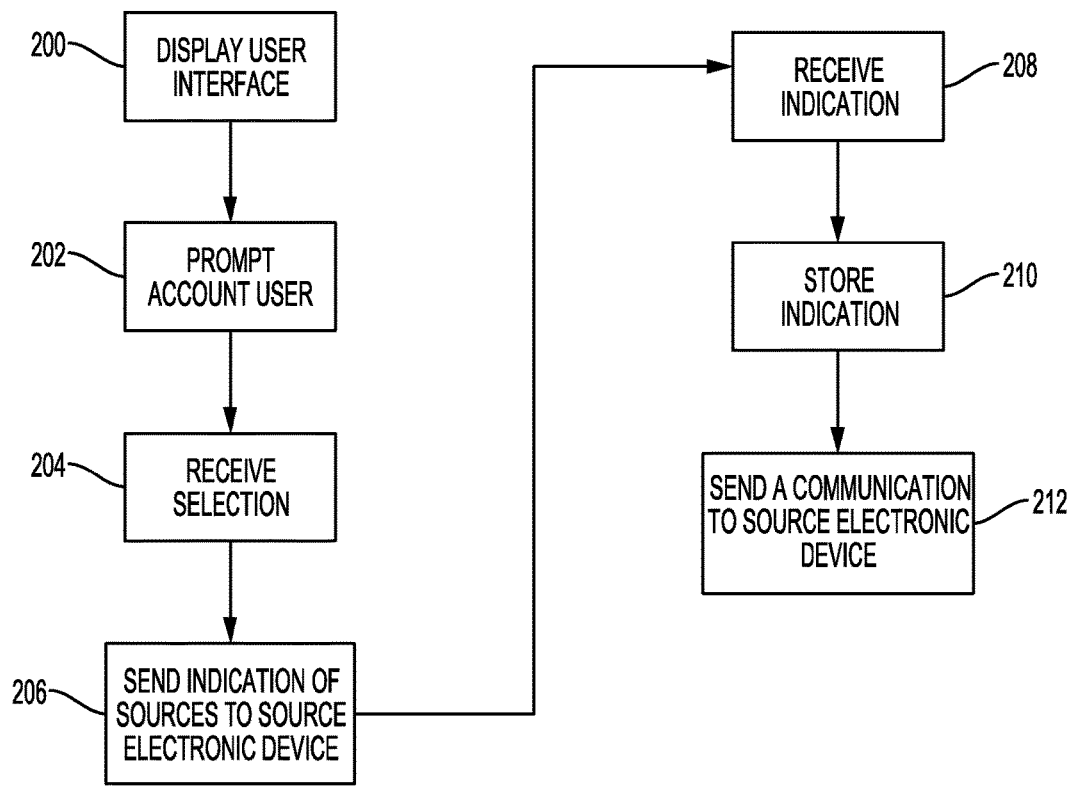
FIG. 2 illustrates a flow chart of an example method of enrolling an account user in a digital history verification process for a user account according to an embodiment.

FIG. 2 illustrates a flow chart of an example method of enrolling an account user in a digital history verification process for a user account according to an embodiment. An account user may enroll when the user creates or registers for an account. Alternatively, an account user may enroll at any time during the existence of the account. Enrollment in a digital history verification process for an account is not a requirement of creating or using an account—it is an optional feature that a user can take advantage of as an alternate authentication approach. A user must explicitly agree to participate in a digital history verification process.

As illustrated in FIG. 2, a client electronic device may display 200 an enrollment user interface on a display device. The enrollment user interface may guide an account user through the setup process for the digital history verification process. For instance, a user interface may prompt a user to confirm that the user would like to participate in a digital history verification process for a target account.

Figure 3A:
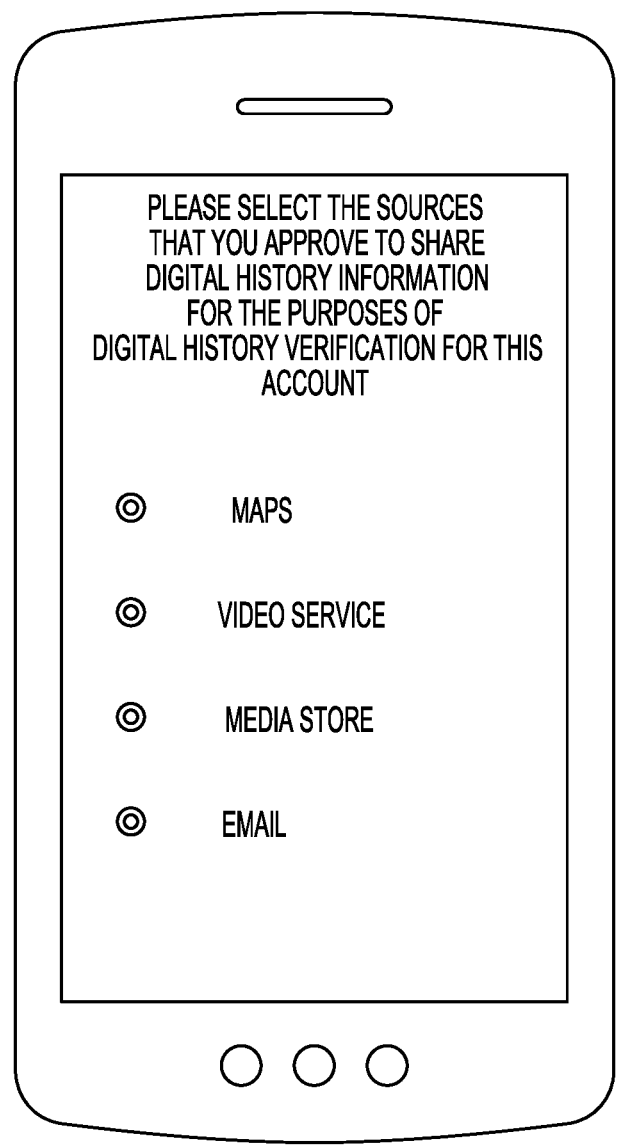
FIGS. 3A and 3B illustrate example user interfaces according to various embodiments.
Figures 3B, 4:
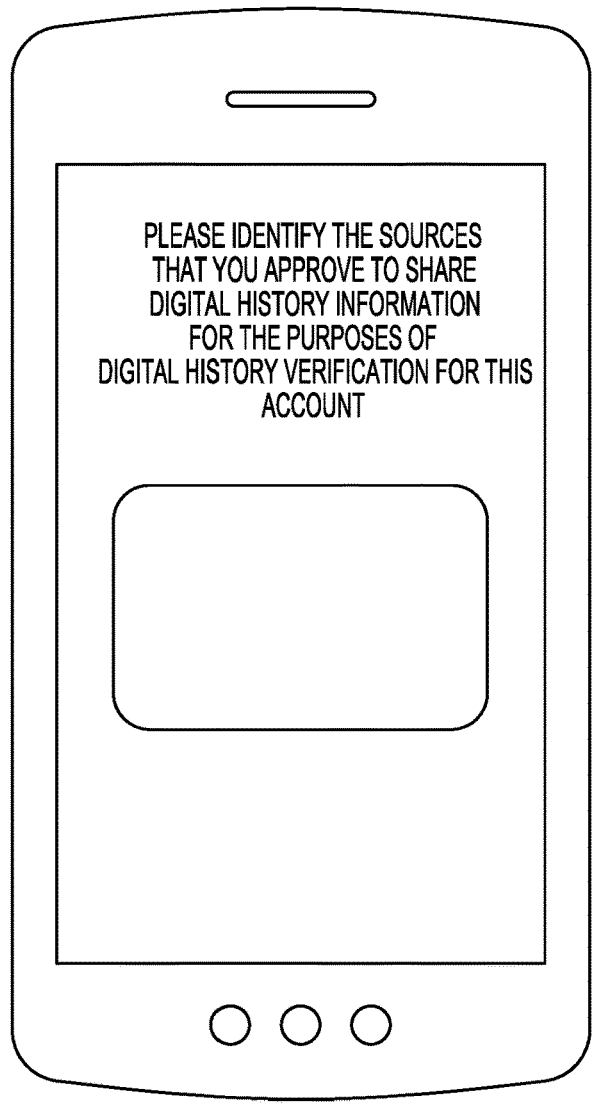
FIG. 4 illustrates an example data store according to an embodiment.

FIGS. 3A and 3B illustrate example enrollment user interfaces according to various embodiments. For instance, the enrollment user interface may prompt 202 an account user to indicate what electronic sources of digital history information may collect digital history information about the account user. As illustrated by FIG. 3A, the enrollment user interface may include one or more visual representations of one or more electronic sources that a user may select. A graphical representation may be a title, a name, a picture, an icon, a logo, a design, a thumbnail, a color and/or the like.

Digital history information refers to information pertaining to other electronic products, services or accounts accessed or used by an account user (such as past actions performed by the user) that is collected by an electronic source (with the user's approval) over a period of time.

A client electronic device may determine one or more electronic sources that are provided by the same service provider as the account at issue. For instance, a user who has an email account with service provider Acme may want to enroll in a digital history verification process for the user's email account. The user's client electronic device may identify other Acme electronic sources from which digital history information for the user can be accessed. Such electronic sources may include, without limitation, location-based services, media services, search services, content subscription services and/or the like. The user interface may present to the user one or more of the electronic sources that are provided by the same service provider as possible electronic sources, and may prompt 202 the user to indicate one or more of the presented electronic sources.

In an embodiment, an enrollment user interface prompts 202 an account user to indicate one or more electronic sources by providing the account list with one or more possible electronic sources from which the user can select. For instance, a client electronic device may determine one or more electronic sources that are present in the form of applications on the client electronic device, and may present to the user one or more visual representations of the applications as possible electronic sources. The possible electronic sources may or may not be offered by the same service provider as the account for which the user is enrolling in digital history information verification.

A user may select one or more electronic sources that the user permits to collect digital history information, and the client electronic device may receive 204 such selections. The client electronic device sends 206 an indication of the electronic sources identified by the account user to an account electronic device.

The account electronic device receives 208 the indication, and stores 210 the indication of the electronic sources in one or more non-transitory computer-readable media sectors of a data store so that they are associated with the account user. For instance, an account electronic device may store the indication of the electronic sources in a relational database so that they are associated with a unique identifier associated with the account user, such as a username, account name and/or the like. FIG. 4 illustrates an example data store according to an embodiment.

For each source authorized by the user, the account electronic device sends 212 a communication to a source electronic device associated with the electronic source. The communication includes data indicating that the user authorized the source to collect digital history information about the user. The communication can be used as a mechanism by which to inform an electronic source that it can share digital history information about the user for digital history information verification purposes with respect to the target account.

Figure 5A:
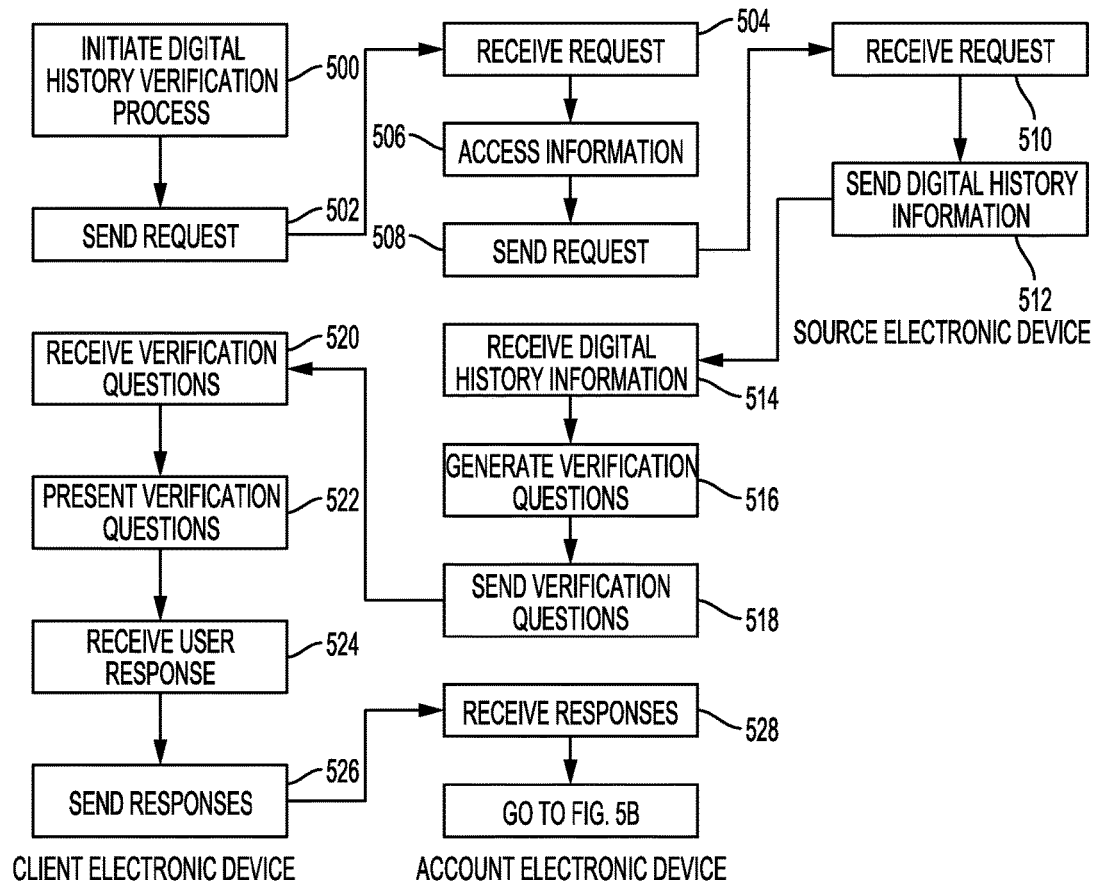
FIGS. 5A and 5B illustrate flow charts of an example method of a digital history verification process for a target account according to an embodiment.
Figure 5B:
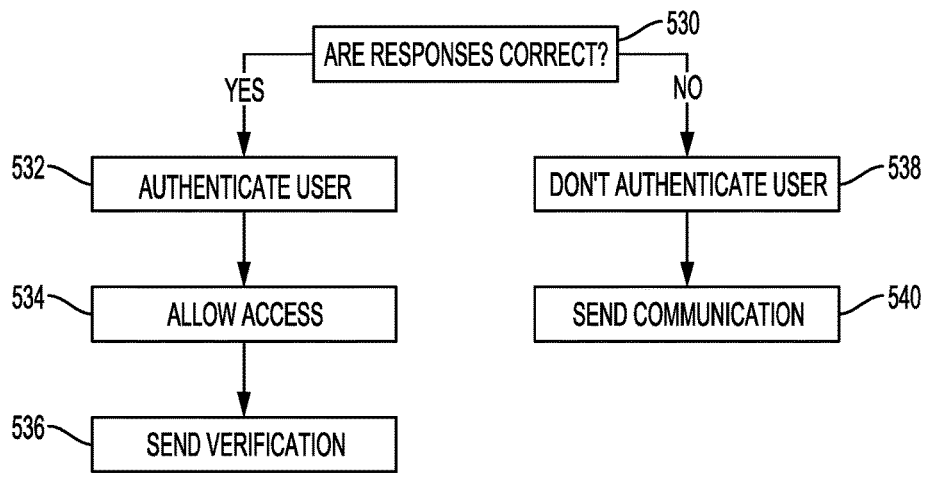
Figure 6:
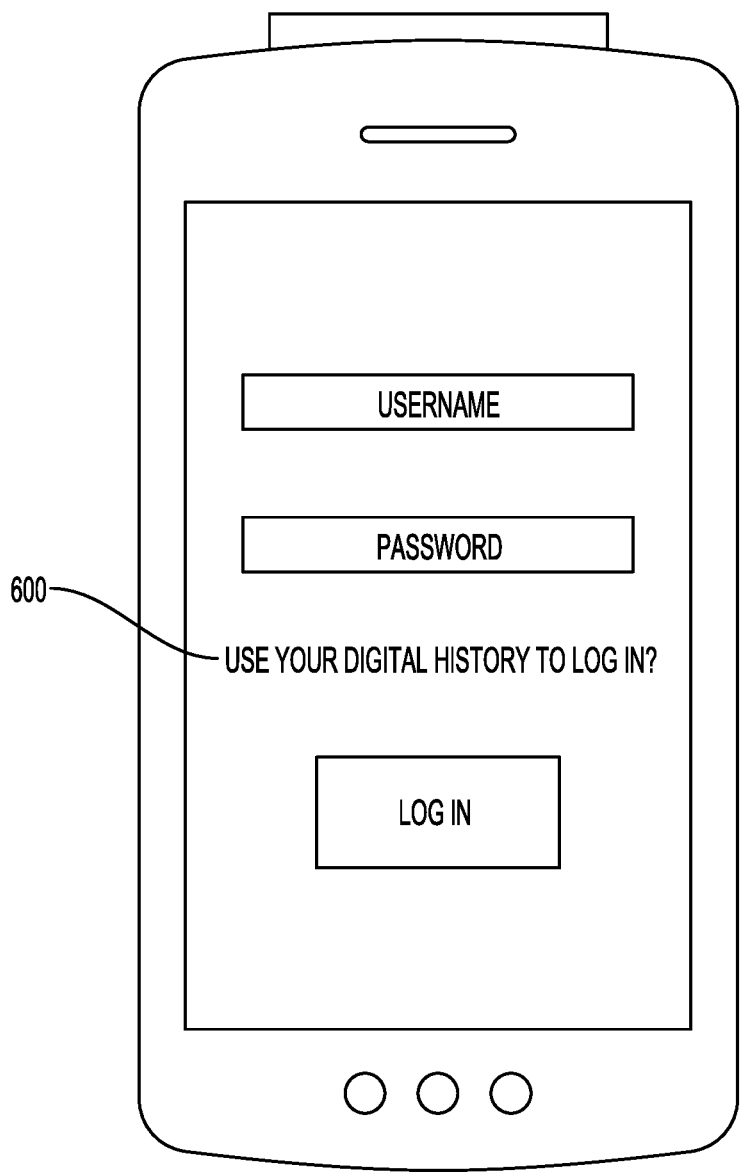
FIG. 6 illustrates an example user interface that includes a graphical element to initiate a digital history verification process according to an embodiment.

FIGS. 5A and 5B illustrate flow charts of an example method of a digital history verification process for a target account according to an embodiment. Once a user has enrolled in a digital history verification process for a target account, the digital history verification process may be initiated 500. The digital history verification process may be initiated 500 by a user. For instance, a client electronic device may output a user interface at the client electronic device, and a user may access the user interface to provide one or more credentials in order to attempt to access a target account. The user interface may include a graphical element by which a user can verify the user's identity through a digital history verification process rather than by providing credentials. For example, if a user forgets his username and password credentials for an account, the user may select a graphical element indicating that the user would like to initiate a digital history verification process to verify his identity. A graphical element may be a hyperlink, a button, a menu or other representation or reference. FIG. 6 illustrates an example user interface that includes a graphical element 600 to initiate a digital history verification process according to an embodiment.

In an embodiment, a digital history verification process may be automatically initiated 500 by a client electronic device. A client electronic device may automatically initiate 500 a digital history verification process in response to a user providing incorrect credentials. For instance, if a user provides incorrect credentials for more than three login attempts, a client electronic device may initiate a digital history verification process. Regardless of how the digital history verification process is initiated, a client electronic device receives an indication that the process is to be initiated.

In response to a digital history verification process being initiated, a client electronic device sends 502 a request to an account electronic device. The request may include a request for one or more historical verification questions to present to the user. A historical verification question refers to a question that is based on digital history information for a user. A historical verification question may be a yes/no question, a free form question and/or the like. The request may include a unique identifier associated with the user. The unique identifier may be a portion of the user's credentials (e.g., a username), an account number, or other identifier.

The account electronic device receives 504 the request. The account electronic device may use the unique identifier included in the request to access 506 information from a data store. For instance, the account electronic device may use the unique identifier to retrieve from a data store the electronic sources that the user has authorized to collect digital historical information. For each identified electronic source, the account electronic device may send 508 a request to one or more source electronic devices associated with the identified electronic sources. The request may include a request for digital historical verification information pertaining to the user.

The source electronic device receives 510 the request, and accesses relevant digital history information for the user. For example, a source electronic device may access digital history information from one or more non-transitory computer-readable media sectors of a data store.

Digital history information may include radio, television or other media channels to which the user is subscribed, applications or other media that is purchased by a user from a particular electronic source, such as an application store, and/or the like. Table 1 illustrates example digital history information and electronic sources according to an embodiment.

TABLE 1

| Electronic Source | Digital history information |
| --- | --- |
| Maps | Location information |
| Content Service A | Subscription information |
| Media store | Purchase or download history over a period of time |

Digital history information is collected by electronic sources in a variety of ways. For example, location services information may include GPS information, positional coordinates or address information that is collected by one or more location sensors (e.g., GPS sensors) of an electronic device over one or more time periods. The electronic device for which location services information is collected may be the same device or a different device than the client electronic device. Example verification questions that may be generated based on location services information include, without limitation, "Were you in New York City on November $1^{st}$?", "What state were you in on November $5^{th}$?", "Did you visit Restaurant X on November $2^{nd}$?" and/or the like.

As illustrated in Table 1, digital history information can include subscription information for a content service, such as, for example, a content streaming service, an on-demand video service, a podcast subscription, a media feed, a social media account and/or the like. Subscription information may include content, for example channels, that a user is subscribed to, content preferences of the user, a viewing history for the user and/or the like. The content service may track and store (with the user's permission) digital history of the user's interaction with content service. For instance, a content service may detect that a user has begun playing a movie via the content service. The content service may update a viewing history for the user to reflect the movie, and may obtain a date and time from a clock to include in the viewing history. Example verification questions that may be generated based on subscription information include, without limitation, "Did you view Content Item Y in the past 30 days?", "Are you subscribed to Channel X?", "Are you a user of Social Media site Z?", "Do you subscribe to podcast W?" and/or the like.

As illustrated by Table 1, digital history information may include purchase or download history for a user of a media store over a period of time. A media store may track a user's purchase or download of content from the store. For instance, a media store may track what content was purchased or downloaded, the cost of any purchases, when the purchase or download was made, any preferences of the user and/or the like. Example verification questions that may be generated based on purchase or download information include, without limitation, "Did you download X app in the last 10 days?", "Have you purchased more than two games from the media store in the past week?" and/or the like.

The source electronic device sends 512 digital history information about the user to the account electronic device. The account electronic device receives 514 digital history information from one or more of the source electronic devices.

The account electronic device generates 516 one or more verification questions based on at least a portion of the digital history information. In certain embodiments, a verification question may be a yes or no question. For instance, an example question may be "Were you in Boston yesterday?" A verification question may be an open ended question. For instance, an example question may be "In what city were you in yesterday?"

The number of verification questions that are required for the digital history verification process may differ based on user, service provider, account and/or the like. For instance, during the enrollment process, a user may indicate a minimum number of verifications that the user is required to answer in order to authenticate his or her identity. The account electronic device may generate at least the minimum number of verification questions.

Alternatively, a service provider may specify a minimum number of verification questions that a use is required to answer. As another example, an account electronic device may generate a random number of verification questions.

Table 2 illustrates example verification questions that are based on the digital history information in Table 1 according to an embodiment.

TABLE 2

| Electronic Source | Digital history information | Question |
| --- | --- | --- |
| Maps | Location information | Were you in Chicago yesterday? |
| Content Service A | Subscription information | Are you subscribed to Channel X on Content Service A? |
| Media store | Purchase or download history over a period of time | Did you download the CNN News app from the media store in the last month? |

Figure 7:
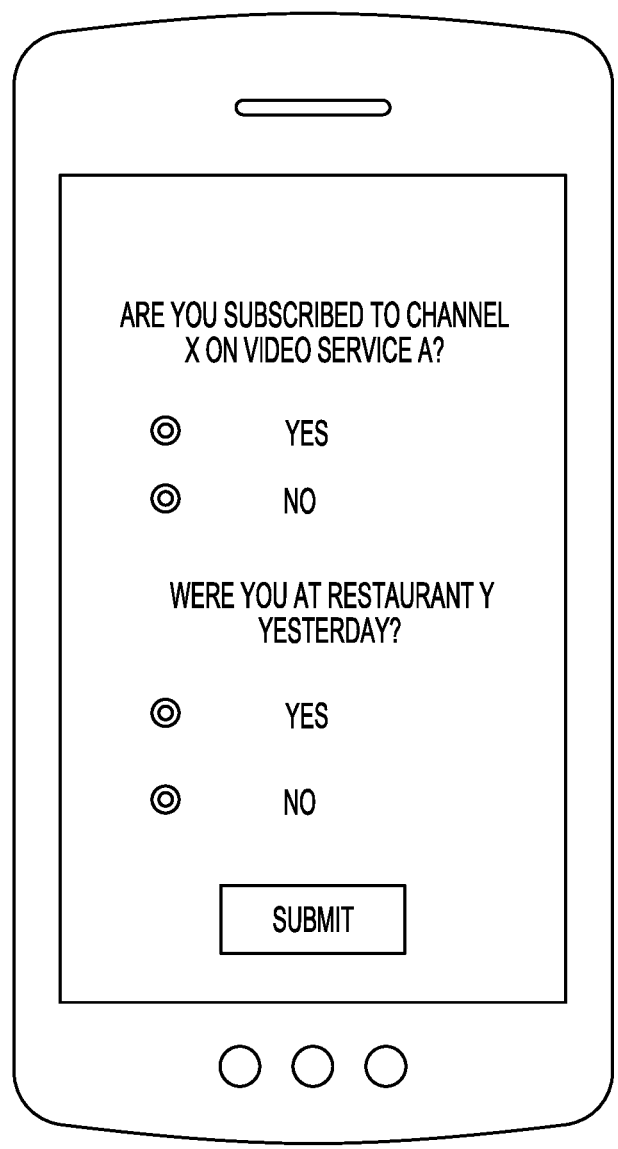
FIG. 7 illustrates an example user interface showing the presentation of verification questions according to an embodiment.

The account computing device sends 518 the verification questions to the client electronic device. The client electronic device receives 520 the verification questions. The client electronic device presents 522 one or more of the verification questions to the user via a user interface. The client electronic device displays one or more of the verification questions along with one or more corresponding answer fields for each verification question. An answer field refers to a graphical user interface field via which an answer to a verification question can be provided. Example answer fields include, without limitation, a free text field, a radial or other button, a toggle switch, a drop down menu, and/or the like. FIG. 7 illustrates an example user interface showing the presentation of verification questions and answer fields according to an embodiment.

The client electronic device receives 524 the user's responses to the present verification questions via one or more of the answer fields, and sends 526 the responses to the account electronic device. The account electronic device receives 528 the responses, and verifies them by determining 530 if the responses are correct based on the digital history information.

Figure 8:
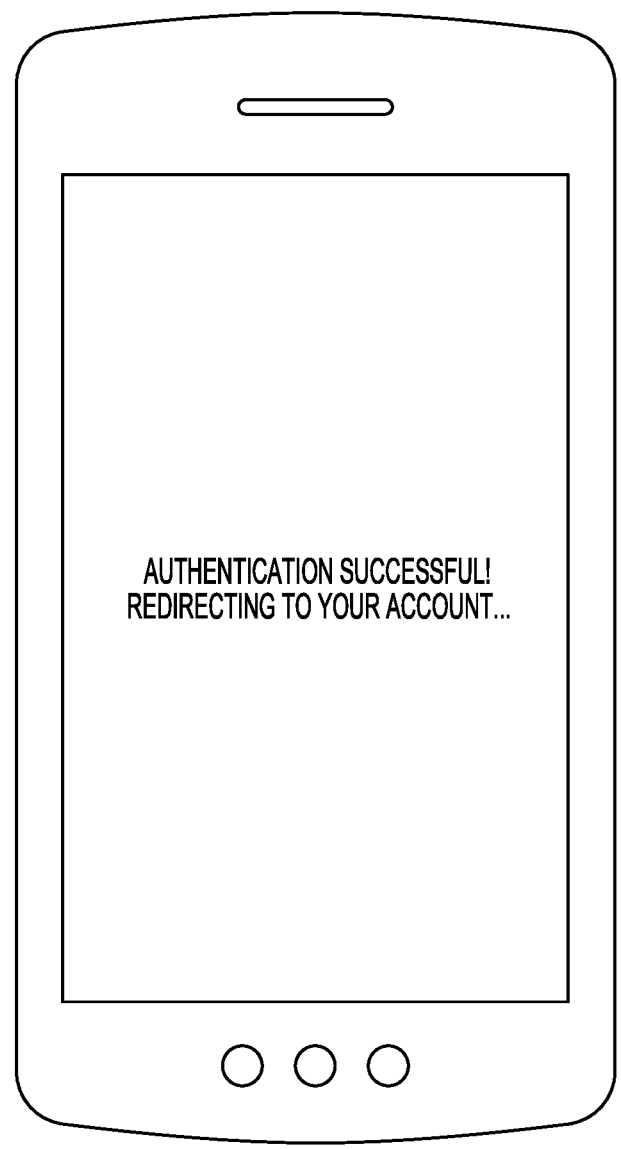
FIGS. 8 and 9 illustrate example user interfaces according to various embodiments.

If the account electronic device determines that the responses are correct, the account electronic device authenticates 532 the user. The account electronic device may authenticate 532 the user if the user answers every verification question correctly. Alternatively, the account electronic device may authenticate 532 the user if the user answers a certain number or percentage of the verification questions correctly. The account electronic device grants 534 the user to access the desired account. The account electronic device sends 536 a verification to the client electronic device indicating that the user has been authenticated. In response, the client electronic device may display a message to the user on the user interface informing the user that the digital verification process was successful, such as that illustrated in FIG. 8. Alternatively, the client electronic device may display information associated with the target account.

Figure 9:
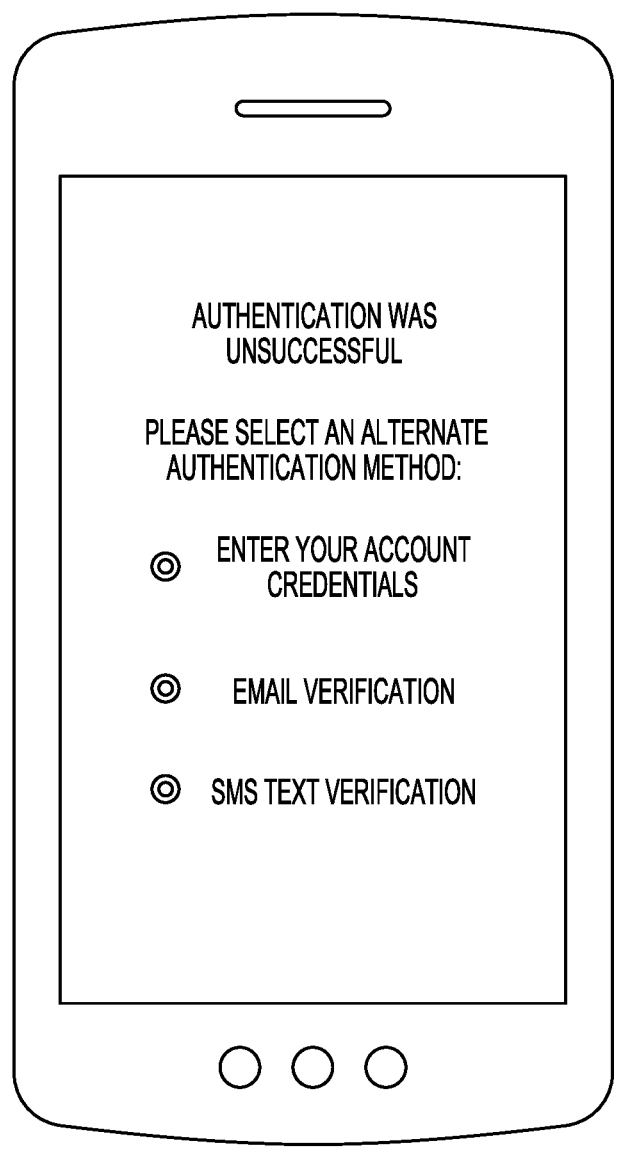

If the account electronic device determines that the responses are not correct, the account electronic device does not authenticate 538 the user. The account electronic device may not authenticate 538 the user if the user answers one or more verification question incorrectly. Alternatively, the account electronic device may not authenticate 538 the user if the user answers a certain number or percentage of the verification questions incorrectly. The account electronic device sends 540 a communication to the client electronic device indicating that the user has not been authenticated. In response, the client electronic device displays a message to the user indicating that the digital verification process was not successful, such as that illustrated in FIG. 9. The message may include a prompt for the user to select an alternative verification process. An alternative verification process may be to retry the digital verification process, or proceed with email or text message verification.

Figure 10:
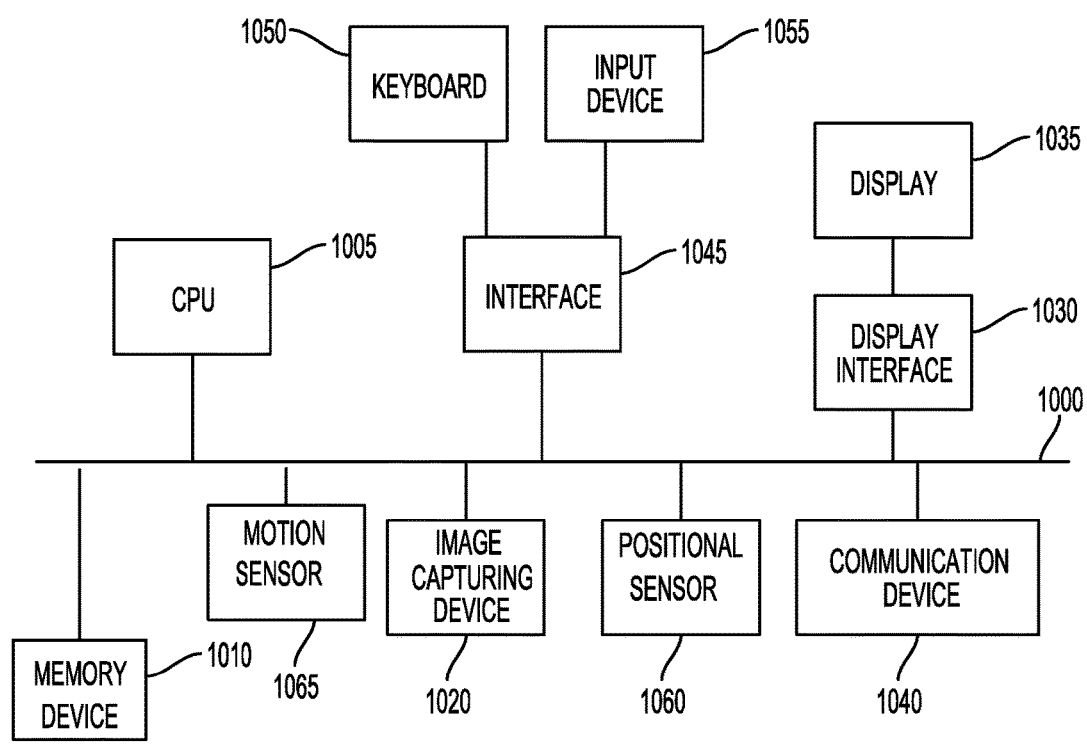
FIG. 10 depicts a block diagram of hardware that may be used to contain or implement program instructions

FIG. 10 depicts a block diagram of hardware that may be used to contain or implement program instructions, such as those of a cloud-based server, electronic device, virtual machine, or container. A bus 1000 serves as an information highway interconnecting the other illustrated components of the hardware. The bus may be a physical connection between elements of the system, or a wired or wireless communication system via which various elements of the system share data. Processor 1005 is a processing device of the, performing calculations and logic operations required to execute a program. Processor 1005, alone or in conjunction with one or more of the other elements disclosed in FIG. 10, is an example of a processing device, computing device or processor as such terms are used within this disclosure. The processing device may be a physical processing device, a virtual device contained within another processing device, or a container included within a processing device.

A memory device 1010 is a hardware element or segment of a hardware element on which programming instructions, data, or both may be stored. Read only memory (ROM) and random access memory (RAM) constitute examples of memory devices, along with cloud storage services.

An optional display interface 1030 may permit information to be displayed on the display 1035 in audio, visual, graphic or alphanumeric format. Communication with external devices, such as a printing device, may occur using various communication devices 1040, such as a communication port or antenna. A communication device 1040 may be communicatively connected to a communication network, such as the Internet or an intranet.

The hardware may also include a user input interface 1045 which allows for receipt of data from input devices such as a keyboard or keypad 1050, or other input device 1055 such as a mouse, a touch pad, a touch screen, a remote control, a pointing device, a video input device and/or a microphone. Data also may be received from an image capturing device 1020 such as a digital camera or video camera. A positional sensor 1060 and/or motion sensor 1065 may be included to detect position and movement of the device. Examples of motion sensors 1065 include gyroscopes or accelerometers. Examples of positional sensors 1060 such as a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method for authenticating an account user, the method comprising:
by a client electronic device comprising a processor, executing programming instructions that cause the processor to:
identify one or more electronic sources from which digital history information is permitted to be accessed, wherein the digital history information represents information about past events;
cause an enrollment user interface to be displayed, wherein the enrollment user interface comprises one or more visual representations of the identified electronic sources from which digital history information is permitted to be accessed;
receive from the user a selection of one or more of the visual representations, wherein each selection is thereby a selection of said electronic source; and
send the one or more selections to an account electronic device to be stored in a data store;
cause a verification user interface to be outputted by the client electronic device, wherein the verification user interface includes a graphical element via which the user, when attempting to access an electronic account using the client electronic device, can initiate a digital history verification process;
receive, via the verification user interface, a selection of the graphical element;
send, to the account electronic device, a request for one or more automatically generated verification questions;
receive, from the account electronic device, one or more automatically generated verification questions that are each based on at least a portion of the digital history information;
display to the user via the verification user interface of the client electronic device:
one or more of the verification questions; and
one or more answer fields that correspond to each of the verification questions;
for each verification question, receive from the user an answer to the verification question via a corresponding answer field for the verification question;
send the received answers to the account electronic device; and
receive, in response to sending the received answers from the account electronic device a verification indicating that the user has been authenticated.

2. The method of claim 1, wherein the one or more selected electronic sources are each associated with a same service provider as the electronic account.

3. The method of claim 1, wherein one or more of the selected electronic sources is associated with a service provider that is different than a service provider of the electronic account.

4. The method of claim 1, further comprising executing programming instructions that cause the processor to:
receive a selection of the graphical element from the verification user interface, wherein the selection initiates the digital history verification process.

5. The method of claim 1, further comprising executing programming instructions that cause the processor to:
in response to receiving the verification from the account electronic device that the user has been authenticated, display via the verification user interface a message indicating that the digital history verification process was successful.

6. The method of claim 1, further comprising executing programming instructions that cause the processor to:
receive, from the account electronic device, a communication indicating that the user has not been authenticated;
in response to receiving the communication indicating that the user has not been authenticated, display via the verification user interface:
a message indicating that the digital history verification process was not successful; and
a prompt requesting the user to select an alternative verification method.

7. A system of authenticating an account user, the system comprising:
an electronic device comprising a processor; and
a non-transitory computer-readable storage medium comprising one or more programming instructions that cause the processor to:
identify one or more electronic sources from which digital history information is permitted to be accessed, wherein the digital history information represents information about past events,
cause an enrollment user interface to be displayed, wherein the enrollment user interface comprises one or more visual representations of the identified electronic sources from which digital history information is permitted to be accessed,
receive from the user a selection of one or more of the visual representations, wherein each selection is thereby a selection of said electronic source,
send the one or more selections to an account electronic device to be stored in a data store,
cause a verification user interface to be outputted by the electronic device, wherein the verification user interface includes a graphical element via which the user, when attempting to access an electronic account using the electronic device, can initiate a digital history verification process,
receive, via the verification user interface, a selection of the graphical element,
send, to the account electronic device, a request for one or more automatically generated verification questions,
receive, from the account electronic device, one or more automatically generated verification questions that are each based on at least a portion of the digital history information,
display to the user via the verification user interface of the electronic device:
one or more of the verification questions; and
one or more answer fields that correspond to each of the verification questions,
for each verification question, receive from the user an answer to the verification question via a corresponding answer field for the verification question,
send the received answers to the account electronic device, and
receive, in response to sending the received answers from the account electronic device a verification indicating that the user has been authenticated.

8. The system of claim 7, further comprising:
an account electronic device, the account electronic device configured to:
access, from a data store, an indication of one or more electronic sources of digital history information that have been authorized by the user,
send, to one or more electronic devices associated with one or more of the electronic sources, a request for digital history information that has been collected by the electronic sources and authorized by the user.

9. The system of claim 8, wherein the digital history information further comprises location services information indicating where a user electronic device associated with the user was located during an applicable time period, wherein the location services information is collected by one or more location sensors of the user electronic device.

10. The system of claim 9, wherein the user electronic device is a different device than the electronic device.

11. The system of claim 7, wherein the one or more selected electronic sources are each associated with a same service provider as the electronic account.

12. The system of claim 7, wherein one or more of the selected electronic sources is associated with a service provider that is different than a service provider of the electronic account.

13. The system of claim 7, wherein the non-transitory computer-readable storage medium further comprises one or more programming instructions that cause the processor to:
receive a selection of the graphical element from the verification user interface, wherein the selection initiates the digital history verification process.

14. The system of claim 7, wherein the non-transitory computer-readable storage medium further comprises one or more programming instructions that cause the processor to:
in response to receiving the verification from the account electronic device that the user has been authenticated, display via the verification user interface a message indicating that the digital history verification process was successful.

15. The system of claim 7, wherein the non-transitory computer-readable storage medium further comprises one or more programming instructions that cause the processor to:
receive, from the account electronic device, a communication indicating that the user has not been authenticated,
in response to receiving the communication indicating that the user has not been authenticated, display via the verification user interface:
a message indicating that the digital history verification process was not successful; and
a prompt requesting the user to select an alternative verification method.

* * * * *